United States Patent [19]

Belinsky

[11] Patent Number: 5,501,625
[45] Date of Patent: Mar. 26, 1996

[54] FLOATING TERMINAL

[76] Inventor: Sidney I. Belinsky, 40 Waterside Plz. Apt. 14A, New York, N.Y. 10010

[21] Appl. No.: 364,285

[22] Filed: Dec. 27, 1994

Related U.S. Application Data

[63] Continuation-in-part of Ser. No. 233,231, Apr. 25, 1994, abandoned, which is a continuation-in-part of Ser. No. 934,707, Aug. 24, 1992, abandoned.

[51] Int. Cl.⁶ ..................................................... B63B 22/02
[52] U.S. Cl. ................................ 441/3; 114/230; 114/293
[58] Field of Search ................................. 114/219, 230, 114/258, 293; 441/3, 4, 5

[56] References Cited

U.S. PATENT DOCUMENTS

| | | | |
|---|---|---|---|
| 2,882,536 | 4/1959 | Jordan | 441/4 |
| 3,236,267 | 2/1966 | Bily | 114/230 |
| 3,522,787 | 8/1970 | Tam | 441/4 |
| 3,585,959 | 6/1971 | Cook | 114/230 |
| 4,331,097 | 5/1982 | Belinsky | 114/230 |
| 4,441,448 | 4/1984 | Hillberg | 114/230 |

*Primary Examiner*—David A. Bucci
*Assistant Examiner*—Thomas J. Brahan

[57] ABSTRACT

The Floating Terminal is designed to facilitate transshipment of cargo between large (deepwater) ships and small shallow water (shuttle) ships.

The main innovations are in the mooring and fendering systems which are attached to the Floating Terminal hull and provide to it the capability of berthing ships in stormy weather and without assistance from tugs.

The Gravity type Breasting Dolphins, which are the core of the new fendering system, have several times more energy absorption capacity and also several times larger deflection, under equal force, that any existing floating dolphin. During severe weather conditions the floating pontoons of the Floating Breasting Dolphins can be lowered on a certain depth below sea level or can be lifted to level of the Floating Terminal main deck. The use of the Gravity type Breasting Dolphin is also seen for the fixed terminals in the not protected and in the protected harbors as well.

6 Claims, 9 Drawing Sheets

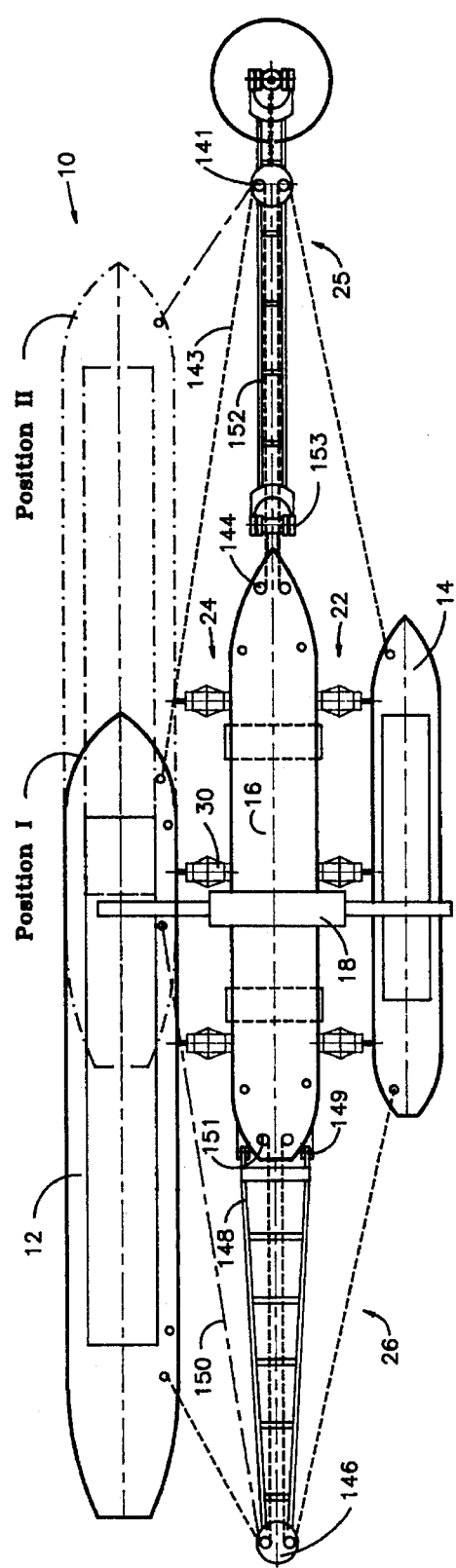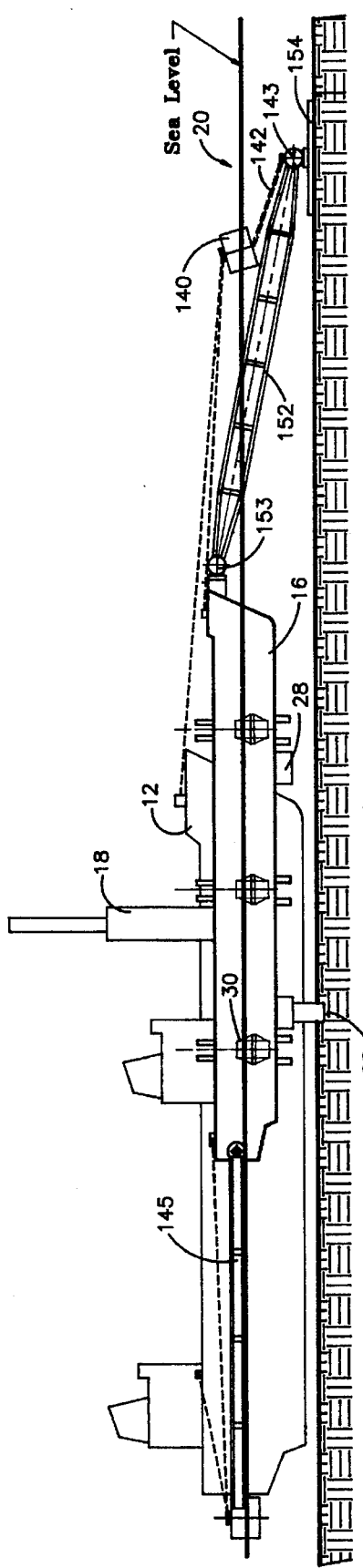

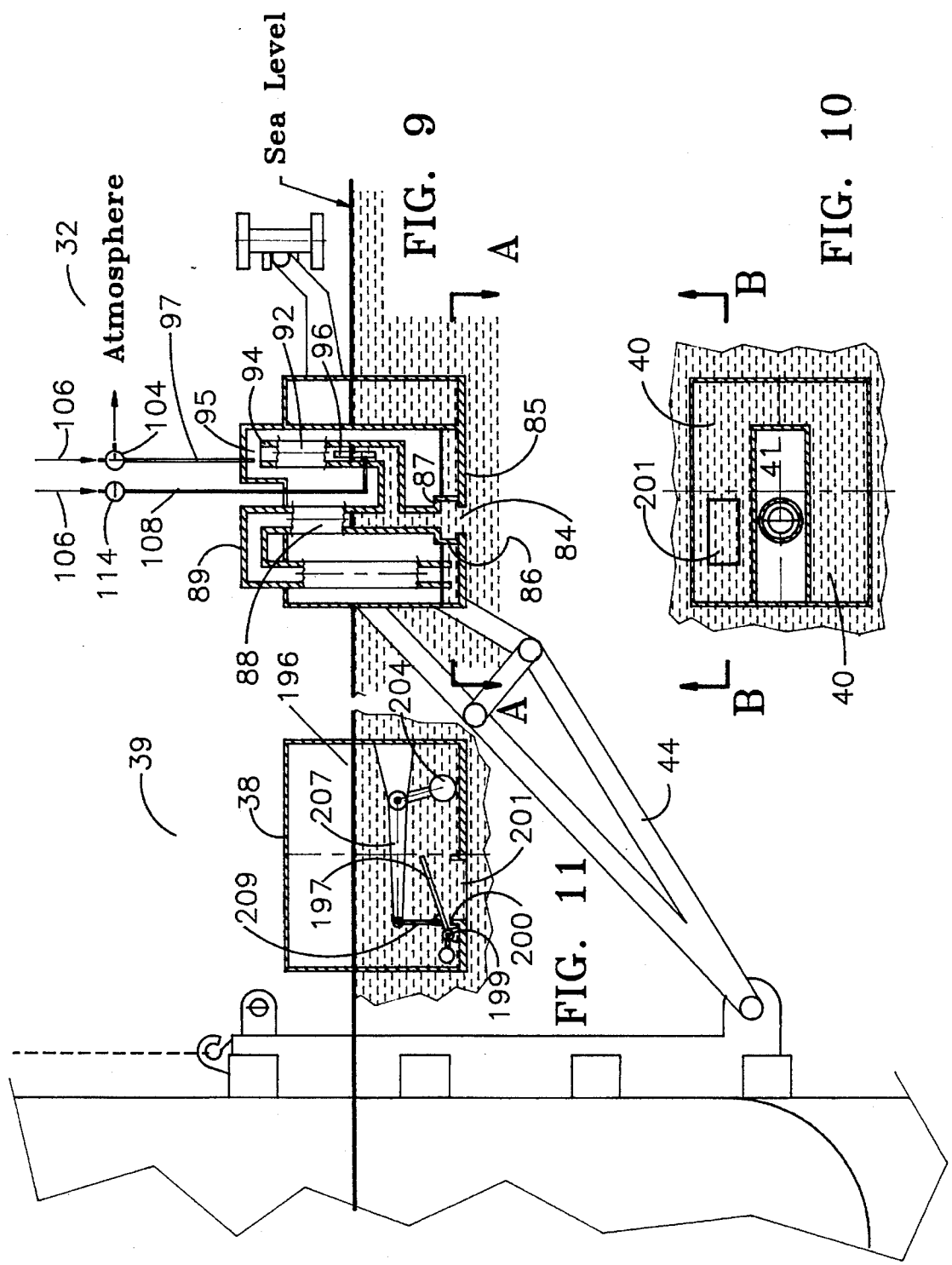

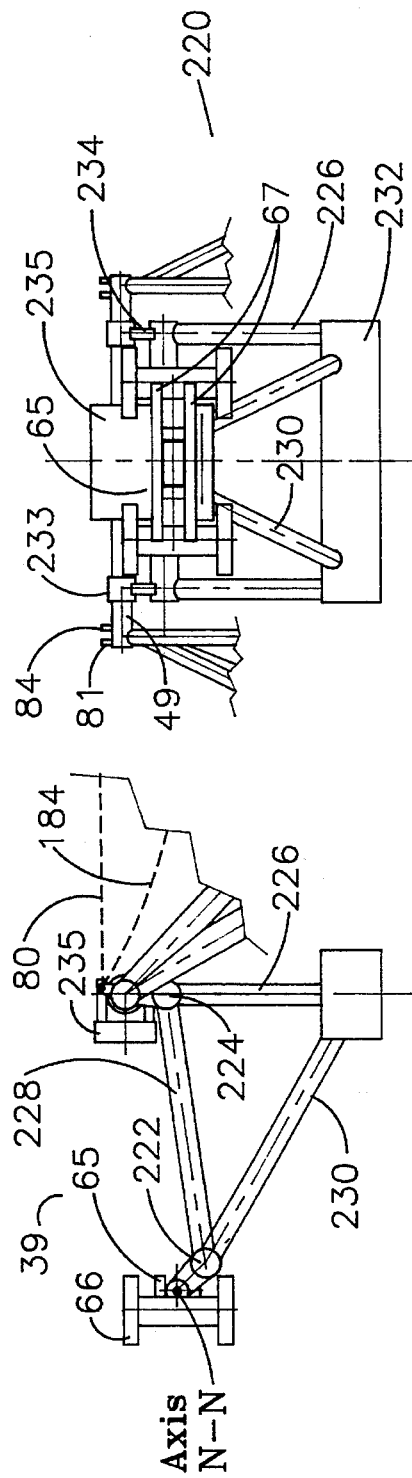
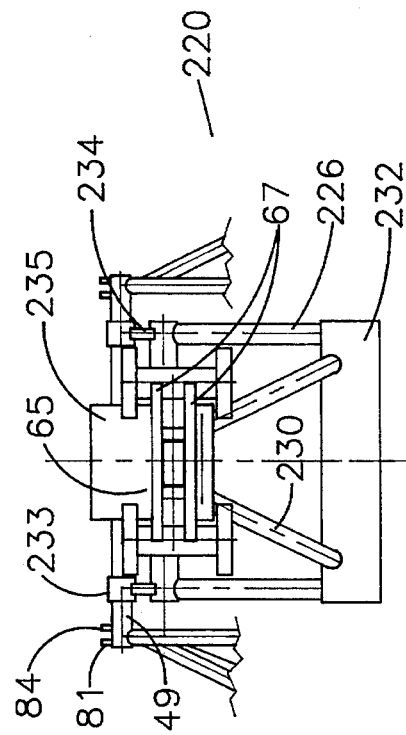
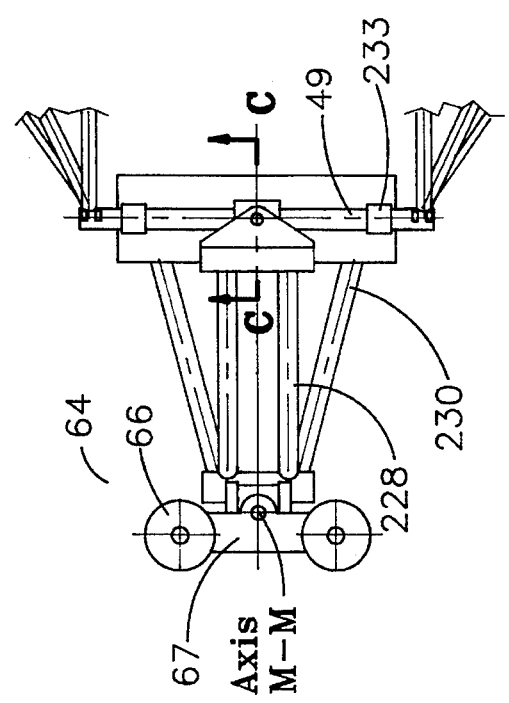
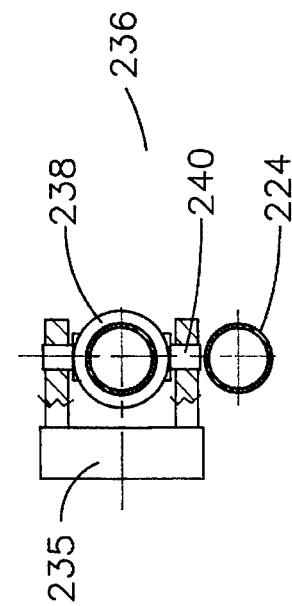
FIG. 13
FIG. 15
FIG. 12
FIG. 14

FLOATING TERMINAL

This is a Continuation-In-Part of patent application Ser. No. 08/233,231 filed Apr. 25, 1994, now abandoned, which was a continuation-in-part of patent application Ser. No. 07/934,767 filed Aug. 24, 1992, also abandoned.

BACKGROUND OF THE INVENTION

This invention relates to Marine and Offshore Industries and more particularly to berthing ships offshore to the floating terminals with the goal of transshipping cargo between two ships.

The economical advantage of utilization Very Large Ships (VLS) for transporting mass bulk cargo and limitations of the existing shallow water ports to handle them created need for the Offshore Deepwater Floating Transshipment Terminals.

Presently, in cases of shallow water import ports, the VLS, before entering port, are partially unloaded "lightened" in deep waters by small shuttle ships until their draft is reduced to the level permitting them to enter the port. In cases of shallow water export ports, the VLS are loaded only partially in the port and after they reach natural deep waters they are loaded to their full draft "topping-off" by small shuttle ships.

One of the drawbacks of these offshore operations is increase in the possibilities of collision between shuttle ship and VLS, since berthing operation often will be performed during the high seas.

Besides the "lightening" and "topping-off" operations, there are often the needs to fully unload (load) VLS outside the shallow water port, because it does not fit into port due to its excessive length even when its draft is reduced.

The existing practice of preventing ships from damaging each other during the berthing operation utilizes floating breasting fenders (pneumatic or rubber). The largest floating breasting dolphins are 15' in diameter and about 20' long and weighting about 20 ton. The maximum deflection of these fenders is about 9' and energy absorption is limited to about 5,000 ft-kips or 700 ton-m.

In spite the giant dimensions of these fenders the berthing VLS practically have to come to a full stop before coming in contact with the fenders. Because of this the safety of berthing operations crucially depends of the weather conditions, thus limiting utilization of the offshore transshipment terminal to a relatively calm seas.

SUMMARY OF THE INVENTION

The object of this invention is to overcome limitations of the present offshore transshipment terminals through a drastic increase in the energy absorption capability of the floating terminal fendering system and in its deflection (flexibility) capability.

This is partially achieved through the use of the author's previous invention ("Floating dolphin" U.S. Pat. No. 4,331,097), which is based on the gravity method of absorbing impact from the berthing ships, instead of absorbing this impact through the resilience of the material from which the fenders are made (the existing practice).

The fendering system designed to be attached to a ship and based of this invention can absorb 10,000–20,000 ton-m of kinetic energy (15–30 times more that the largest existing fender) and deflect on about 60 ft (almost 7 times more than the largest existing fender). Due to these features and that the initial contact between incoming ship and the floating breasting dolphin will be almost 100 ft from the ship-terminal the maximum allowable berthing speed of the incoming ship can be increased almost by factor 5 (from 0.5 ft/sec to 2.5 ft/sec). Also the limit of the berthing angle can be increased from 5 degrees to 10–15 degrees.

GENERAL DESCRIPTION

The Floating Terminal, according to the instant invention, is installed in the offshore waters by means of a single point anchoring system, consisting of rigid arm connected to the ship bow and a swivel joint anchored to the sea bottom. Due to this connection the Floating Terminal can rotate around the swivel joint responding to the changes in the wind and waves direction. The VLS is moored to one side and the shuttle ship is moored to the other side. The cargo handling equipment, located on the deck of the Floating Terminal, will facilitate movement of the cargo from one ship to the other or will store it in the holds, when shuttle ship is absent.

The main innovations of the instant invention, in comparison with the U.S. Pat. No. 4,331,097, are in the ways how the concept of a breasting dolphin, utilizing gravity method of absorbing impact energy from the berthing ship, is incorporated into the berth of the Floating Terminal. Among these innovations are:

- The design of the pivot frame is done in a form of a structure with two interconnected arms, which permits to accommodate longitudinal forces acting along the Floating Terminal without the use of longitudinal lever.
- The lower ends of the pivot frame are connected to the hull of the Floating Transshipment Terminal through a vertical sliding carriage.
- The means for controlling vertical position of the breasting dolphin correspondingly to the changes in the Floating Terminal draft or the weather conditions (waves or ice movement).
- The fender, attached to the counterweight, incorporates horizontally oriented wheels. This significantly reduces the magnitude of a longitudinal force acting on the dolphin when the berthing ship continue its forward movement, after contacting the fender.
- The system of two chains are introduced to control the position to which the pivot frame with the counterweight can be lowered.
- The element named "stopper" is introduced to limit rotation of the counterweight around the pivot axis on the fender.

The specific innovations introduced to the Floating Terminal design are:

- Quick actuating arresting anchoring arrangement, which prevents the Floating Terminal from lateral movement under the force from the berthing ship. This anchoring arrangement is actuated shortly before berthing operation starts and is immediately return to a stowed position after berthing operation is ended. When the anchor is pulled out of the soil the capability of the Floating Terminal to rotate around its bow anchor is fully restored.
- Mooring system which utilizes mooring winches located on the Floating Terminal to control longitudinal movement of the berthed ship along the Floating Terminal. To provide sufficient longitudinal movement of the berthed ship the bow guiding sheaves are located on a mooring buoy, attached to a bow anchor, and the stem sheaves on a special stem mooring floating dolphin attached by a long tress to the stem part of the Floating Terminal.

The nature and substance of this invention as well as its objects and advantages will be more clearly perceived and fully understood by referring to the following detailed description and claims taken in connection with the accompanying drawings.

BRIEF DESCRIPTION OF THE DRAWINGS

FIG. 1 is a plan view illustrating the Floating Terminal with shuttle ship and VLS moored to its both sides.

FIG. 2 is an elevation of the Floating Terminal.

FIG. 4 is a section A—A from FIG. 3 illustrating plan view of quick actuating arresting anchoring arrangement.

FIG. 9 is a section through a Gravity Floating Breasting Dolphin pontoon.

FIG. 10 is a section A—A from FIG. 9.

FIG. 11 is a section B—B from FIG. 10.

FIG. 12 is a second embodiment of the counterweight.

FIG. 13 is a side view of FIG. 12.

FIG. 14 is a plan view of FIG. 12.

FIG. 15 is a section C—C from FIG. 14.

DETAILED DESCRIPTION

Figure 3:
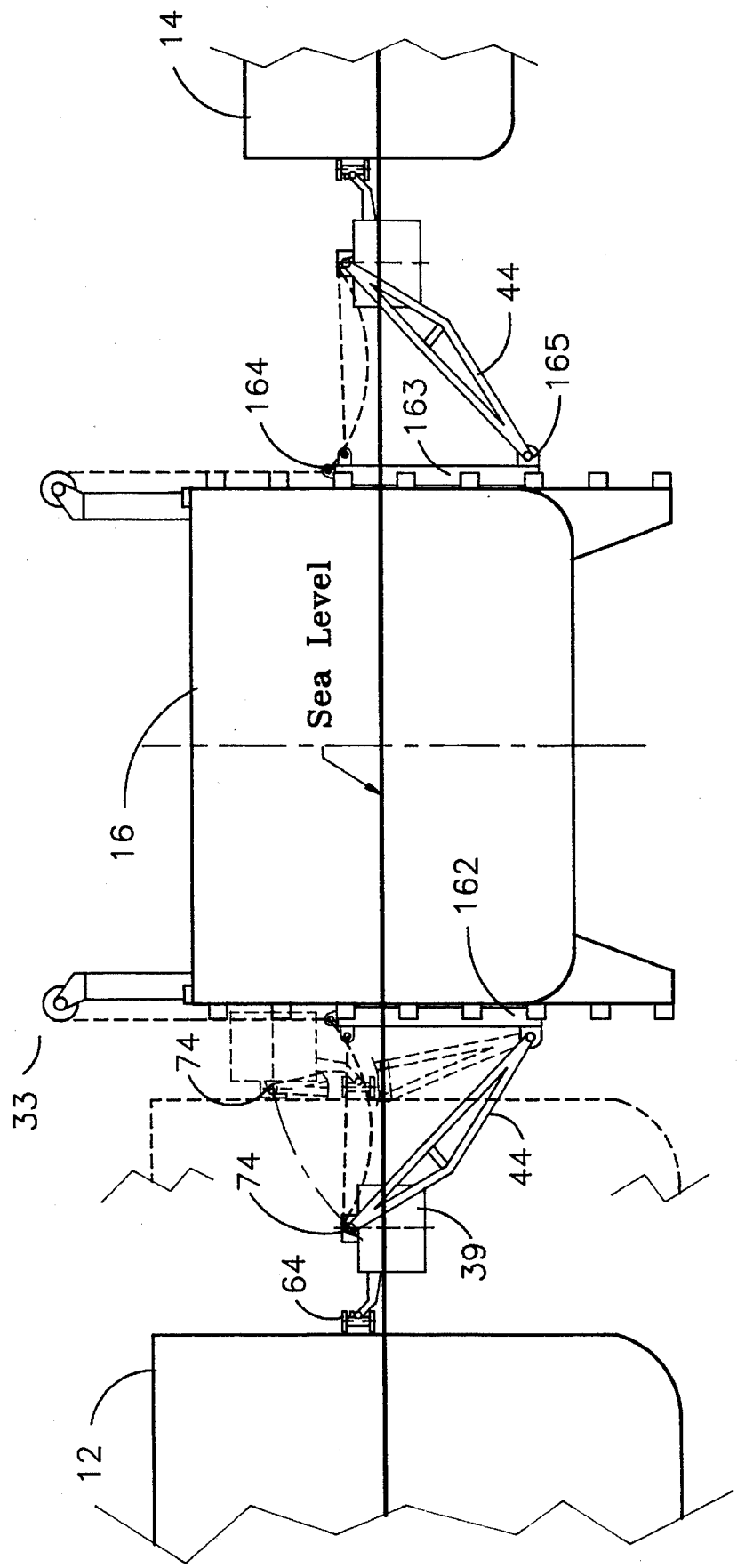
FIG. 3 is a section through a Floating Terminal with the shuttle and VLS moored.

Referring to FIGS. 1; 2 and 3 there is a Floating Terminal 10, VLS 12 and shuttle ship 14. The Floating Terminal 10 includes ship 16, cargo handling installation 18, single point bow anchoring arrangement 20, a fendering system 22 starboard and 24 port side, a bow and a stem mooring systems 25 and 26 correspondingly and quick actuating arresting anchoring arrangements 28.

The two quick actuating arresting anchoring arrangements 28 (FIG. 1; 2 and 8) are located along the ship 16 in the vicinity of the gravity breasting dolphins. Each of them consists of a pivoted arm 116 with a soil penetrating blade 115 and a compartment 117 on its outer end. Pivoted arm 116 is connected by pin 118 to a frame 119. Latching arrangement 122, for securing pivoted arm 116 in its upper-position, consists of a latch 123, connected with counterweight 124 having hollow space 125, and a hook 129 attached to the pivoted arm 116.

The pneumatic actuating system (shown schematically) of the pivoted arm 116 includes opening 130 in the bottom of compartment 117, pipeline 131 and a three-way valve 134, connecting the system with atmosphere 105 or with the source of compressed air 106. The pneumatic actuation system of the latching arrangement 122 includes opening 135 in the bottom of the hollow space 125, pipeline 136 and a three-way valve 134 connecting the system with atmosphere 105 or with the source of compressed air 106.

The bow mooring system 25 (FIGS. 1 and 2) includes a bow mooring buoy 140, two guiding sheaves 141, chain 142, bow mooring line 143 and bow mooring winch 144. The stem mooring system 26 includes stem mooring floating dolphin 145 consisting of a floating pontoon 146, two guiding sheaves 147, truss type structure 148, connected to the stem part of ship 16 through a pair of parallel bearings 149, stem mooring line 150 and stern mooring winch 151.

The single point bow anchoring arrangement 20 consists of a beam 152 in the form of a truss connected by upper end to the bow of the ship 16 through an universal joint 153 and by its lower end to an anchored foundation 154, also through an universal joint 155.

Each of the fendering systems 22 and 24 (FIGS. 3; 4 and 5) consist of three gravity breasting dolphins 30. Each dolphin 30 consists of a counterweight 39 with a stopper-fender 74, a pivot frame 44, a fender 64, sliding vertical carriage 162, and a hoisting system 33 for lifting or lowering the sliding carriage 162.

Pivot frame 44 is designed to accommodate perpendicular and longitudinal force acting on the floating dolphin 30. It consists of two arms 45 and 46 interconnected by ties 47, 48 and 49. The tie 49, attached to the tip of the pivot frame 44, serves as an pivot axis K—K for the counterweight 38. The tie 48, attached to lowest part of the pivot frame 44, serves as its pivot axis L—L and as the means through which the pivot frame 44 is connected to the sliding vertical carriage 162.

Figure 4:
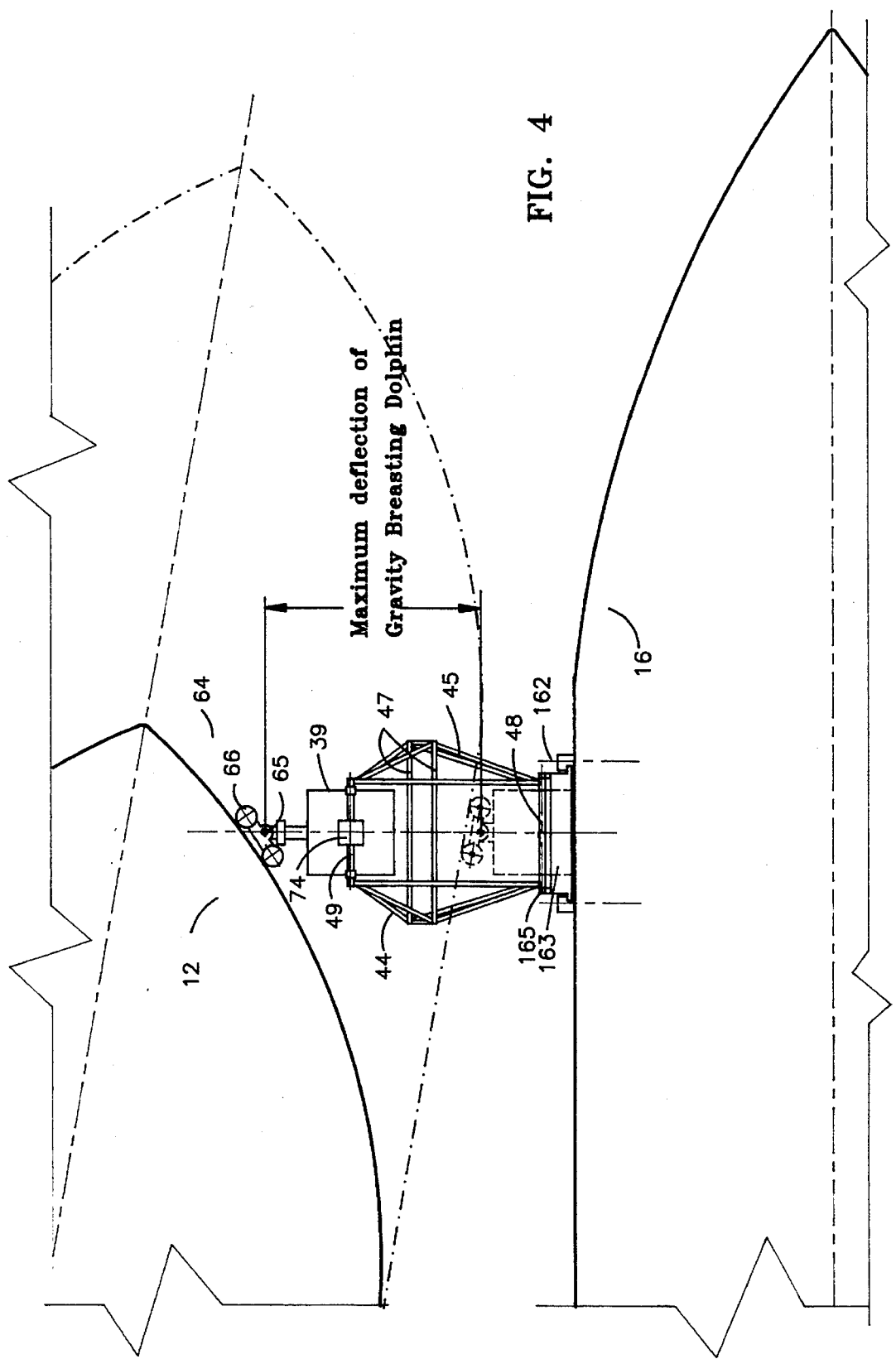
FIG. 4 is a plan view of the Gravity Breasting Dolphin.

A stopper-fender 74 (FIGS. 4, 5 and 6), attached to the counterweight 38, consist of a plate 76 and supports 78. Plate 76, covered by a rubber, serves as a fender when it contacts berthing ship hull, as the result of its 90 degrees rotation (see position III on FIG. 6 and positions III and IV on FIG. 16).

A sliding vertical carriage 162 (FIGS. 3, 4 and 5) consists of a frame 163 with two lifting hooks 164 and two beatings 165, through which the sliding carriage is engaged with tie 48 of the pivot frame 44.

A fender 64 (see FIGS. 4, 5, 6, 12 and 13) consists of two pair of horizontally positioned wheels 66, assembled on a frame 65, consisting of two balanced beam 67. The frame 65 is connected to the counterweight 38, through an universal joint 69 (with M—M and N—N axis of rotation) and cantilever 72.

A pair of hoisting systems 33 for lifting and lowering the gravity breasting dolphin and installing it on the upper deck of the Floating Terminal. This operations are required to accommodate changes in the Floating Terminal draft, to prevent gravity breasting dolphin from being destroyed by stormy sea or ice movement and for transportation purposes. Each system 33 consists of a guiding plates 170, a hoisting drive 172, a sheave arrangement 176, a stopper 180 and a hoisting chain 184 permanently connected to a pad eye 84 (FIGS. 7 and 13) of the pivot frame 44. and engaged or disengaged from the chain hook 164 of the sliding carriage 162.

Operation of hoisting system 33 consists of two steps:

Lifting (lowering) the sliding carriage 162. This is achieved through actuating hoisting chains 184 engaged with chain hook 164.

Figure 5:
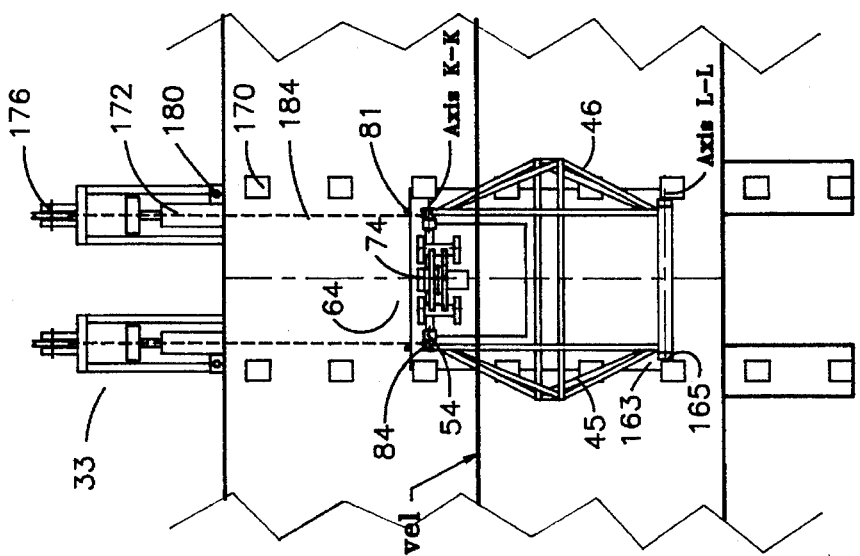
FIG. 5 is a side view of the Gravity Breasting Dolphin
Figure 6:
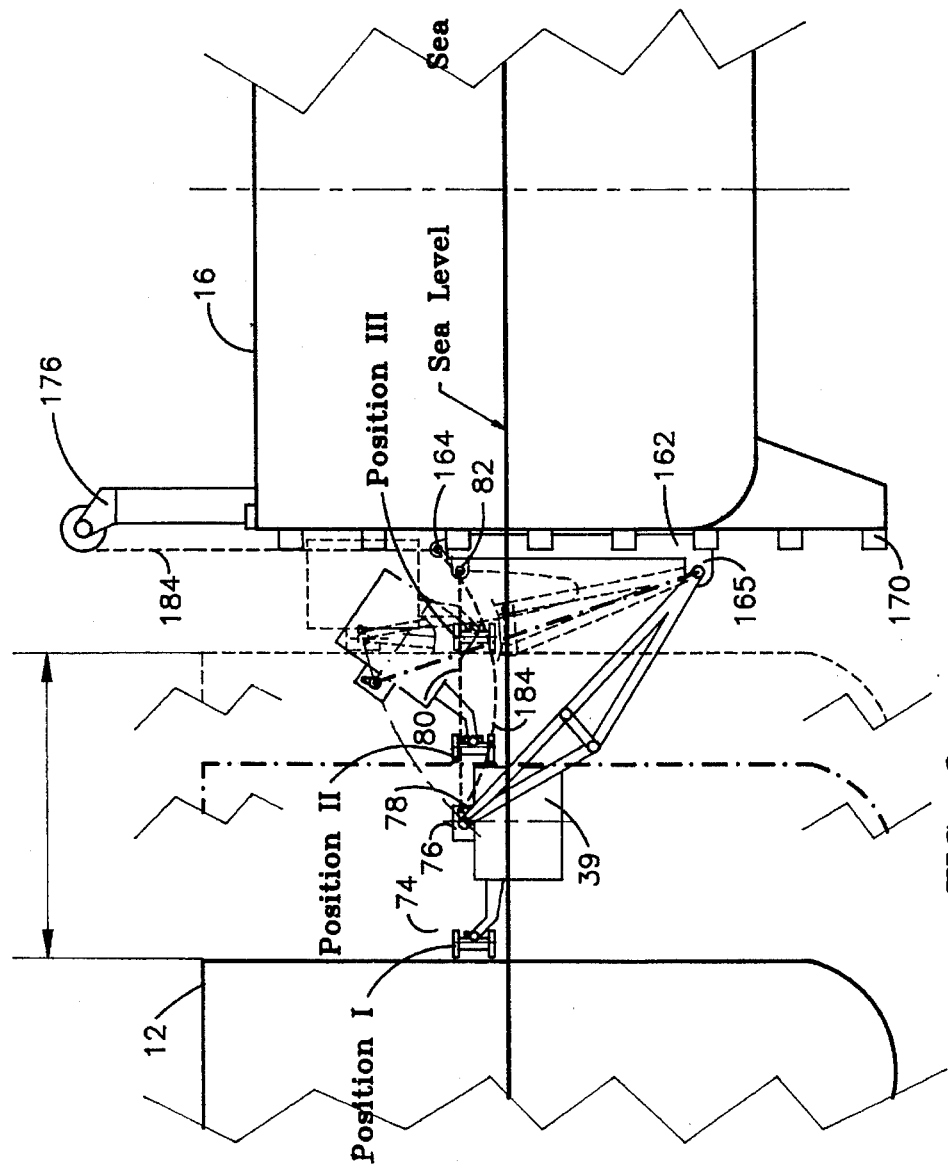
FIG. 6 is a section through the Floating Terminal illustrating the Gravity Breasting Dolphin operation.
Figure 7:
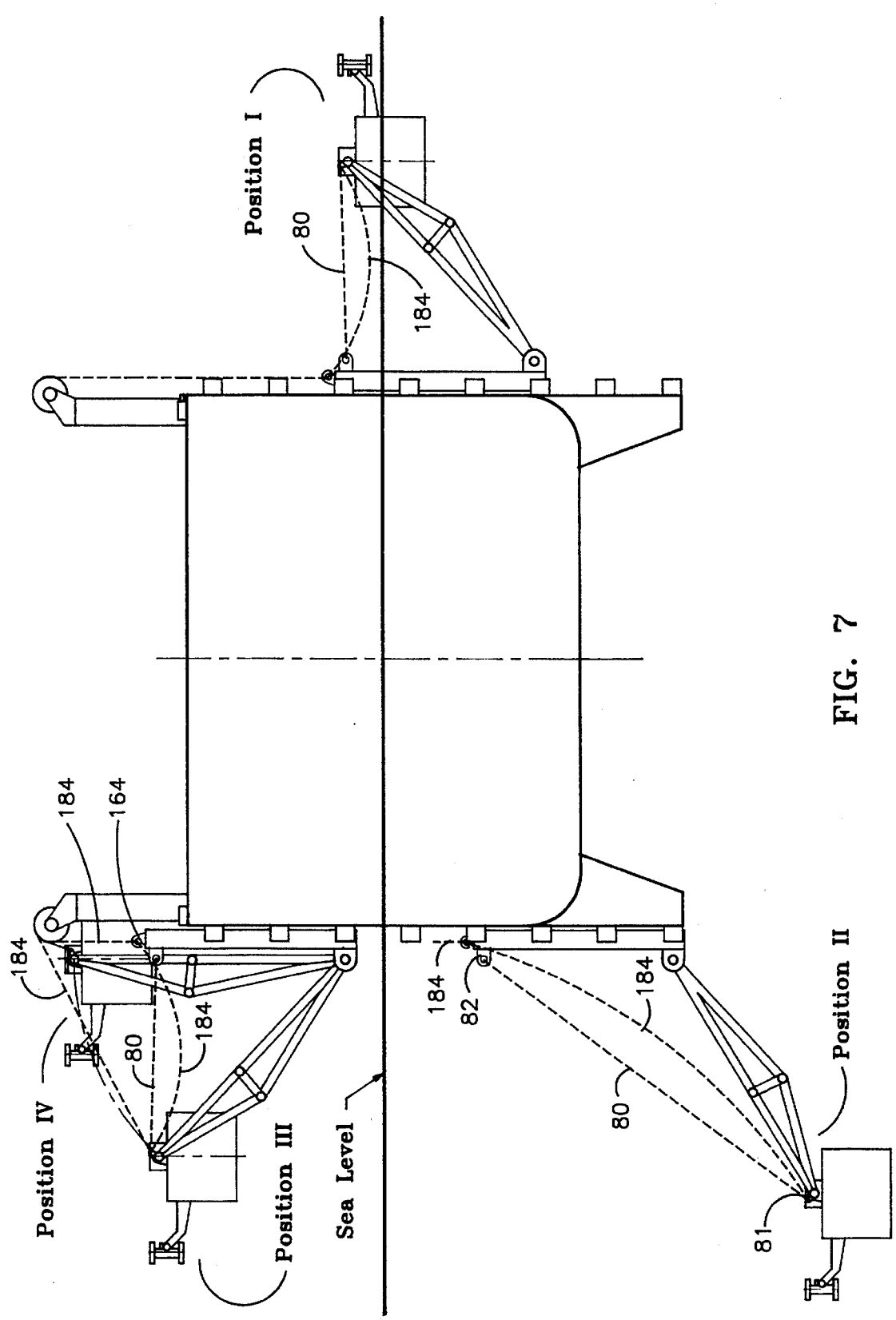
FIG. 7 is a section through the Floating Terminal illustrating various positions of the Gravity Breasting Dolphin.
Figure 8:
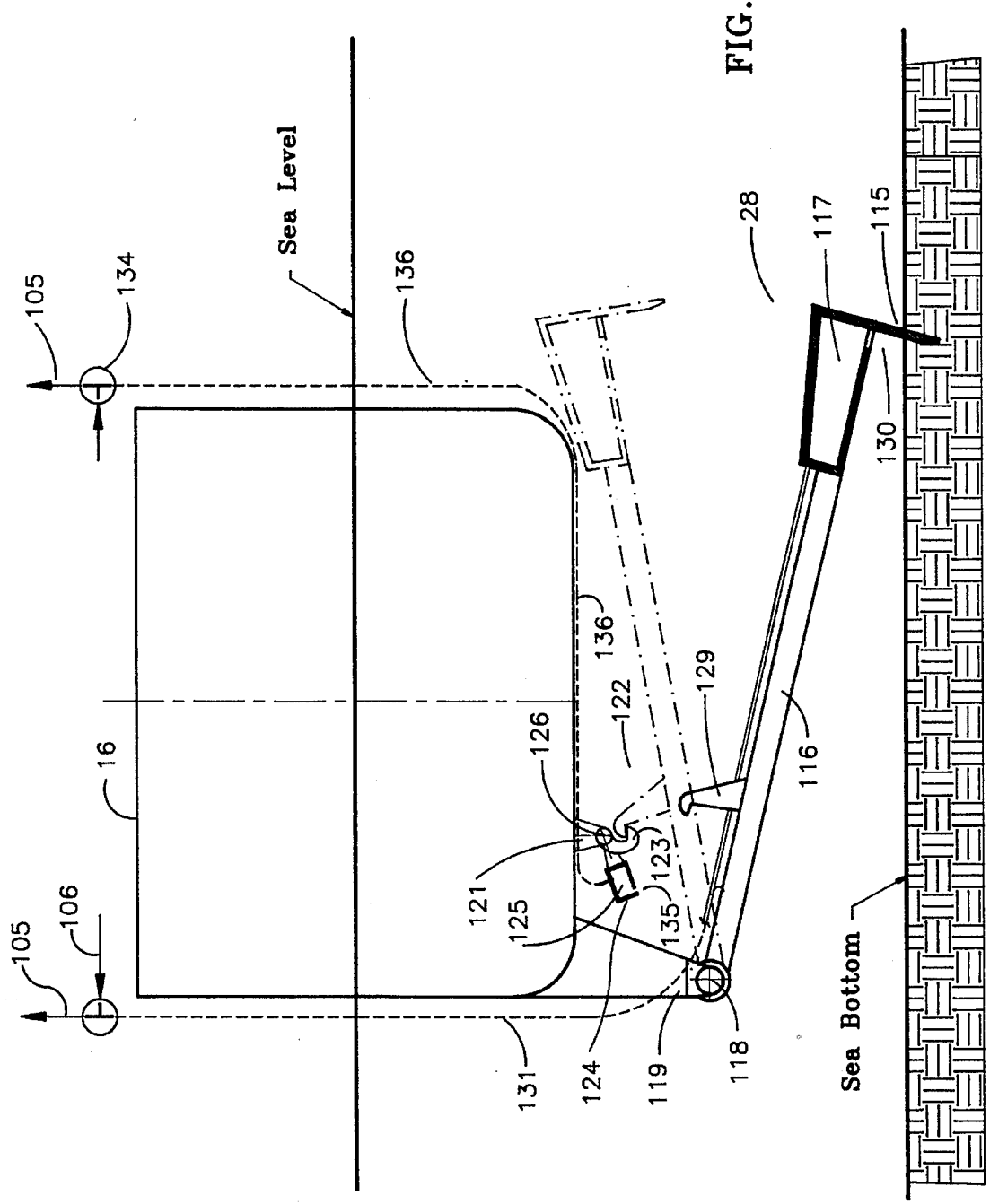
FIG. 8 is a section illustrating arresting system.

Pivoting pivot frame into vertical position. This operation starts only after sliding carriage is reached its upper position and fixed in it by stopper 180. In this position the pivot frame 44 is supported by a chains 80 and hoisting chains 184 are is released from tension, thus providing safe conditions for their disengagement from the chain hooks 164. After the slack in the hoisting chains 184 is tensioned by the hoisting drive 172, the further actions of the drive 172 will start to rotate pivot frame 44 around its axis L—L until it comes in vertical position (FIGS. 5, 6 and 7).

A system limiting submerging of the gravity breasting dolphin 38 (FIG. 7) includes a pair of stopper-chains 80, connected by one end to the pad eye 81, attached to the tip of the pivot frame 44 and by the other end to the pad eye 82, attached to the top of the sliding vertical carriage 162.

The counterweight 39 has two embodiments.

The first Embodiment.

The first embodiment (see FIGS. 6, 9, 10 and 11) is in the form of a floating pontoon 38, which interior is divided into two interconnected outer compartment 40 and one central compartment 41. During the normal operation the own weight of the of the pontoon is compensated by the buoyancy of the of the pontoon central compartment 41 and pontoon 39 floats with a certain draft. At this condition the outer compartments 40 are filled with surrounding water through the opening 201 to the level according to the pontoon draft.

For the purpose of submerging and refloating pontoon 38 has system 32. The elements of this system are located in the central compartment 41. They include: an opening 84 in the bottom plate 85, cylinder 86 and plate 87 forming a housing above this opening; a pipe 88, which loop (as a part of siphon 89) is elevated above the pontoon's deck 90 and which is connected through horizontal pipe 91 with water air-lift pump 92, formed by vertical pipe 94 and pneumatic nozzle 96. The upper end of the vertical pipe 94 is projected into a pocket 95, which is also above the pontoon's deck 90. The top of the pocket 95 is connected to the source of compressed air 106 through pipeline 97 and three-way valve 104. The water air-lift pump 92 is connected to the source of compressed air 106 through pipeline 108 and valve 114.

Submerging and Refloating Operation.

Submerging of pontoon 38 is achieved by pumping compressed air through the air-lift pump 92 which sucks water through opening 84 and pumps it into vertical pipe 94. Since the space of pocket 95 is connected with atmosphere through three-way valve 104, the water jet from pipe 94 will hit the top of pocket 95 and than will start to fill-up central compartment 42. After the amount of water inside the central compartment 42 will exceed the compartment 42 buoyancy capacity, pontoon 39 will start to sink.

Refloating of pontoon 39 is achieved by pumping compressed air into central compartment 42 through the pocket 95. Air pressure will move water through siphon 89 and opening 84 outside the central compartment space. As soon as total buoyancy of the pontoon 38 will become positive it will start to refloat. Accidental flooding of the central compartment 42 is prevented by elevating upper loop of siphon 89 and vertical pipe 94 above the pontoon's deck 90.

A gravity valve control system 196, allowing water to freely flow out of the pontoon 38, when lifted vertically, or to be contained inside the pontoon, when pontoon is inclined, is located in inside compartment 40. It consists of a balanced clack 197 with counterweight 198 and pivot axis 199, clack seat 200 attached to the bottom plate 85 and the gravity actuator 202. The main part of this actuator is the gravity mass 204 attached to two arm lever 207. The actuator 202 consists of two arm lever 207 with counterweight 204 and a rod 209 connecting tip of lever 207 with rack 197.

Operation of a gravity valve control system 196.

In case pontoon 39 is lifted from water vertically the water in pontoon 38 can freely flowout through the open clack 197. When pontoon is fully out of water the space 40 of pontoon 38 will be empty, thus reducing the force required to continue the process of lilting pontoon from the water.

In case when pontoon is floating on the water surface and the berthing ship contacts it the immediate action will be pontoon deviation from the vertical position. As soon as pontoon becomes inclined the gravity mass 204 will rotate clack 197 toward its seat 200, thus closing the opening through which water could flow out of the space 40 of the pontoon 39. Therefore the total mass of the pontoon does not change when it is lifted from water trader the action from the berthing ship.

These provisions allow to use the cheapest water ballast for increasing the fender energy absorption capability and rapidly remove it, when pontoon is lifted to the ship's main deck.

The second embodiment of the counterweight of the Gravity Breasting Dolphin. The second embodiment of the counterweight 39 consists of—balancer 220 (FIGS. 12–15) which is formed as of an open framed structure, having a minimum of buoyancy in comparison with pontoon type counterweight. It consists of a from crossbeam 222, a rear crossbeam 224, a pair of columns 226, a pair of horizontal beams 228, a pair of brackets 230, a solid ballast 232, a pair of bearings 233 with supports 234, a stopper-fender 235 connected to the middle of the rear crossbeam 224 through an universal joint 236, formed by a sleeve 238 with pair on pins 240.

Fendering System Operation.

Energy Absorption.

The main features of the new Gravity Breasting Dolphin, such as a 10 fold increase in the dolphin deflection and in the energy absorption capability, plus location of the breasting line 20–30 meters off the Floating Terminal board, allows the berthing ship to approach the first point of the contact with the berth under some forward speed. The FIG. 4 demonstrates such a case.

The operation of absorbing energy from the impact between the berthing ship and the Gravity Breasting Dolphin (utilizing the first Embodiment) is similar to operation described in U.S. Pat. No. 4,331,097. The kinetic energy of the berthing ship transforms into potential energy of the pontoon 38 (filled with water ballast) lifted from water on a certain height. During the first moment of contact between the ship and the dolphin the resistance is minimal, since the weight of pontoon is fully compensated by the buoyancy forces. The resistance is growing proportionally to deformation of the dolphin and to the height on which pontoon is lifted above water. The FIG. 6, through 3 positions of the Gravity Breasting Dolphin, illustrates this process.

Figure 16:
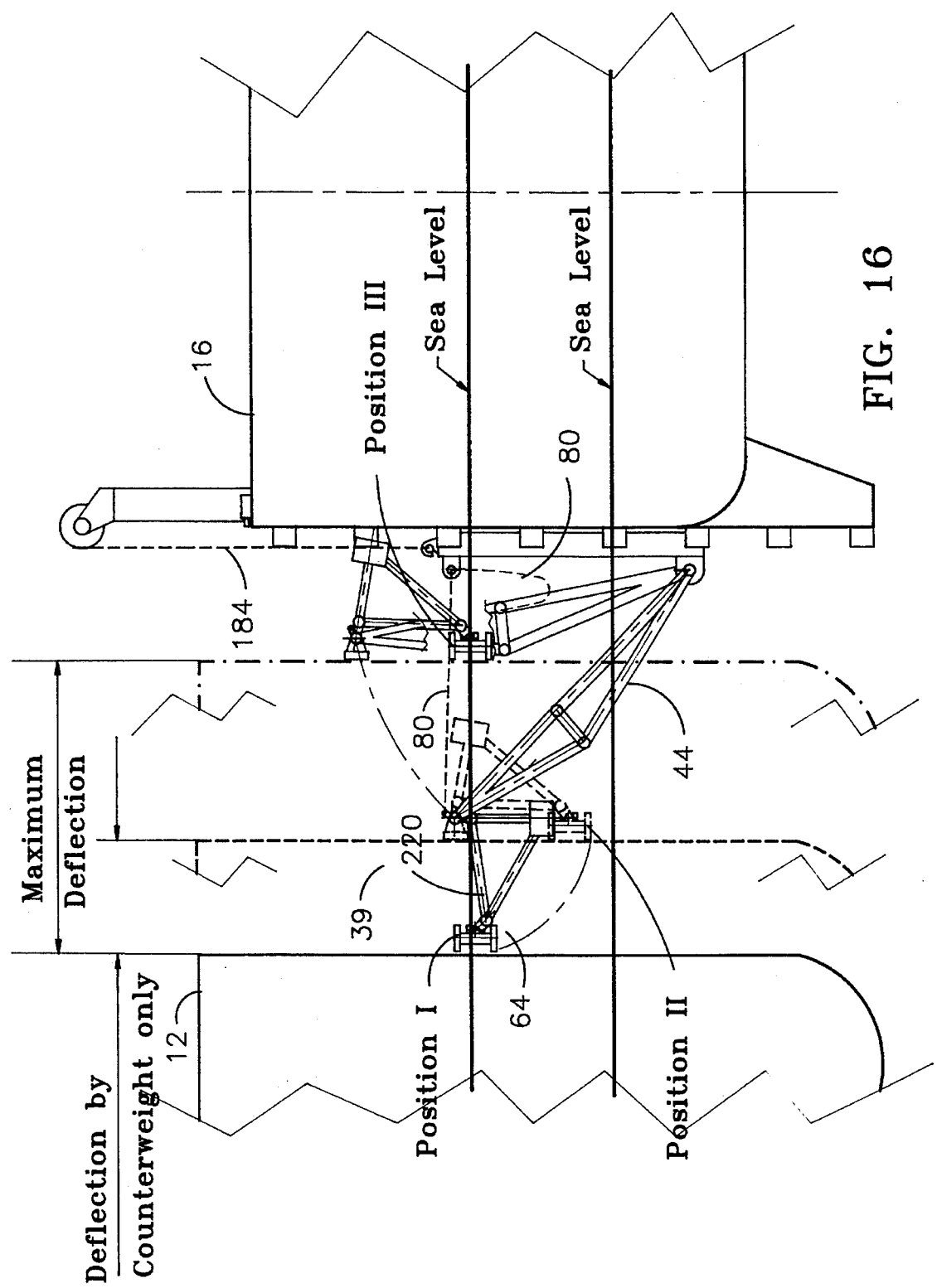
FIG. 16 is a section through a Floating Terminal illustrating operation of the Gravity Breasting Dolphin with a second embodiment counterweight.

The operation of absorbing energy from the impact between the berthing ship and the Gravity Breasting Dolphin (utilizing second Embodiment) is different from the case with the first Embodiment (FIG. 16). The weight of the counterweight is not compensated by the buoyancy forces. More, the entire counterweight might be positioned above the water level. At the initial moment, when the berthing ship comes in contact with the fender, the balancer 220 is in equilibrium and the force required to start deflection of the dolphin (rotation of the balancer) is also minimal. Since the balancer starts rotate the resistance force and dolphin deflection increases proportional to the angle of its rotation. As soon the fender 66 and stopper-fender 235 come simultaneously in contact with the berthing ship hull (position III), this slacking the stopper-chain 80, stops rotation of the balancer and starts rotation of the pivot frame 44 starts. The total resistance force of the Gravity Breasting Dolphin reaches it maximum and than (from position III to position IV) starts to diminish proportionally to the following rotation of the pivot frame and the further increase in the Gravity Breasting Dolphin deflection.

Installations of the Gravity Breasting Dolphins.

Four positions of the Gravity Breasting Dolphin are illustrated by FIG. 7.

Position I—is an operational position.

Position II—is a position when Dolphin is lowered below the sea level to avoid waves actions or interference with the ice movement. Depending on the water depth the length of the stopper-chain 80 would be proportionally adjusted.

Position III—Dolphin lifted in the upper position to avoid wave actions and interference with the ice movement.

Position IV—Dolphin in transportation mode.

What I claim is:

1. A floating terminal for transferring cargo from a large ship to a small shuttle ship or vice versa, said floating terminal having a single point anchoring arrangement having a central hub, around which said floating terminal can rotate, to which cargo ships can berth at both port and starboard sides, comprising:
    a fendering system permanently attached to at least one of said port and starboard sides and comprising at least two parallel gravity type floating breasting dolphins;
    a mooring system which includes:
        a bow mooring buoy with two guiding sheaves, said mooring buoy being chained to said hub of said single point anchoring arrangement;
        a stern mooring floating dolphin comprising a floating pontoon, a truss type structure connecting said floating pontoon with the stern of said ship through a pair of bearings having a common axis, and two guiding sheaves located on the upper deck of floating pontoon; and
    at least two quick actuating arresting arrangements on each of said port and starboard side of said floating terminal for preventing lateral movements of said floating terminal upon impact with the berthed ships.

2. A floating terminal as recited in claim 1, wherein said quick actuating arresting arrangements each comprise:
    a pivot arm extending transversely with respect to said floating terminal, said pivot arm having a first end carrying a soil penetrating blade and a second end having a pivot axis at the corner of the hull of said floating terminal; and
    means for raising, lowering and fixing the position of said first end.

3. A gravity breasting dolphin for a floating terminal, said gravity breasting dolphin capable of absorbing impact from a berthed ship by transferring the ship's kinetic energy into potential energy through lifting said gravity breasting dolphin, said gravity breasting dolphin comprising:
    a counterweight;
    a fender having horizontally positioned wheels assembled on a frame and attached to said counterweight through a universal joint;
    a pivot frame having two arms, said arms being interconnected by ties which connect them at the ends and at the middle of the arms, one of said ties, which connects the ends of said arms serving as a pivot axis for said counterweight, said counterweight being suspended by two bearings, another of said ties which connects the other ends of said arms serves as a pivot axis of said pivot frame for the connection of the pivot frame to said floating terminal;
    a vertically sliding carriage interposed between and connecting said pivot frame and said floating terminal;
    means for lifting and lowering said sliding carriage;
    means for limiting the pivotal movement of said pivot frame comprising a pair of chains each connected at one end to one end of the pivot frame and at the other end to the sliding carriage; and
    a stopper-fender comprising a plate and supports attached to the counterweight, which limits rotation of said counterweight around said universal joint by coming in contact with the hull of said berthing ship.

4. A gravity breasting dolphin as recited in claim 3 wherein said means for lifting and lowering said sliding carriage comprises;
    a set of guiding plates attached to said floating terminal for controlling the vertical movement of said sliding carriage;
    a hoisting arrangement having at least two lifting lines fixed to one arm end of said pivot frame and engaged with two lifting hooks at the top of said sliding carriage; and
    two hydraulically operated stoppers for engaging with said sliding carriage and fixing its position at a desired height.

5. A gravity breasting dolphin as recited in claim 3 wherein said counterweight comprises a pontoon having means for submerging and refloating said pontoon, and a compartment with water ballast having means for preventing said water ballast from flowing out when said pontoon is lifted from the water in a pivoted manner and for allowing water to flow out when said pontoon is lifted in a non-pivoted manner.

6. A gravity breasting dolphin as recited in claim 4, wherein said means for submerging and refloating said pontoon comprises:
    an opening in the bottom of said central compartment including a housing;
    a siphon pipe having a loop portion projecting above the upper deck of said pontoon, one end of said loop portion being connected to said housing and the other end of said loop portion located slightly above the bottom of said pontoon;
    a water air-lift pump in the form of a vertically orientated pipe, one end of said pipe connected to said housing and the other end of said pipe located in a pocket formed above the deck of said pontoon;

a pneumatic system containing two pipelines connected to source of compressed air on said floating terminal, one of said pipelines actuating said air-lift pump for submerging said pontoon, and the other of said pipelines including a three-way valve as to serve as a ventilation conduit for removal of excess air during submerging and for supplying air to said central compartment of said pontoon for removing ballast water for refloating said pontoon.

* * * * *